US012371929B2

(12) United States Patent
Uhrin et al.

(10) Patent No.: US 12,371,929 B2
(45) Date of Patent: Jul. 29, 2025

(54) SECURING ARRANGEMENT ON A MOTOR VEHICLE DOOR

(71) Applicant: Kiekert AG, Heiligenhaus (DE)

(72) Inventors: Michael Uhrin, Oak Park, MI (US); Scott Bills, Howell, MI (US); Jeffrey C. Spencer, Pinckney, MI (US)

(73) Assignee: Kiekert AG, Heiligenhaus (DE)

( * ) Notice: Subject to any disclaimer, the term of this patent is extended or adjusted under 35 U.S.C. 154(b) by 144 days.

(21) Appl. No.: 18/180,227

(22) Filed: Mar. 8, 2023

(65) Prior Publication Data

US 2024/0301728 A1 Sep. 12, 2024

(51) Int. Cl.

| | |
|---|---|
| ***E05B 81/24*** | (2014.01) |
| ***E05B 79/22*** | (2014.01) |
| ***E05B 81/48*** | (2014.01) |
| ***E05B 85/08*** | (2014.01) |

(52) U.S. Cl.

CPC .............. *E05B 81/25* (2013.01); *E05B 79/22* (2013.01); *E05B 81/48* (2013.01); *E05B 85/08* (2013.01)

(58) Field of Classification Search

CPC .......... E05B 85/08; E05B 79/02; E05B 79/06; E05B 79/22; E05B 77/34; E05B 81/25; F16C 1/10; F16J 15/16

See application file for complete search history.

(56) References Cited

U.S. PATENT DOCUMENTS 3,205,727 A * 9/1965 Sevrence ................ F16C 1/107 74/500.5
3,836,269 A * 9/1974 Koscik ..................... F16J 15/02 403/197
4,889,005 A * 12/1989 Crack ...................... G05G 1/46 74/502.6
4,929,007 A * 5/1990 Bartczak ................. E05B 79/20 292/216
5,765,447 A * 6/1998 Goffena .................. F16C 1/107 74/502.5

(Continued)

FOREIGN PATENT DOCUMENTS

DE 7716177 U1 2/1978
DE 102018128027 A1 5/2019

(Continued)

OTHER PUBLICATIONS

Espacenet machine generated translation of JP 2003120647 A (Year: 2024).*

(Continued)

*Primary Examiner* — Kristina R Fulton
*Assistant Examiner* — Emily G. Brown
(74) *Attorney, Agent, or Firm* — Renner, Otto, Boisselle & Sklar, LLP

(57) ABSTRACT

A securing arrangement on a motor vehicle door, which is equipped with an actuating element, in particular a securing button, and with a mechanical transmission element for acting upon, for example, a motor vehicle latch. The actuating element penetrates a door opening and is coupled to the transmission element. In addition, an additional sealing element is provided in the region of the door opening. According to the invention, the sealing element is provided on/or in a grommet engaging over the mechanical transmission element.

8 Claims, 2 Drawing Sheets

(56) References Cited

U.S. PATENT DOCUMENTS

| | | | | | |
|---|---|---|---|---|---|
| 6,142,035 | A * | 11/2000 | Babatz | E05B 83/36 | |
| | | | | 292/201 | |
| 10,837,200 | B2 * | 11/2020 | Bauer | E05B 85/08 | |
| 2003/0173786 | A1 * | 9/2003 | Miyagawa | F16C 1/107 | |
| | | | | 292/262 | |
| 2016/0186458 | A1 * | 6/2016 | Balakrishna | E05B 79/20 | |
| | | | | 29/434 | |
| 2019/0106913 | A1 * | 4/2019 | Fukuchi | E05B 79/22 | |
| 2019/0218829 | A1 * | 7/2019 | Uhrin | F16C 1/107 | |
| 2019/0309546 | A1 * | 10/2019 | Kawamoto | E05B 79/04 | |
| 2021/0079695 | A1 * | 3/2021 | Nagaoka | E05B 77/34 | |

FOREIGN PATENT DOCUMENTS

| | | | | |
|---|---|---|---|---|
| JP | S6187221 | U | * | 6/1986 |
| JP | 2003120647 | A | * | 4/2003 |
| JP | 2021120507 | A | * | 8/2021 |

OTHER PUBLICATIONS

Machine generated translation of JP S6187221 U (Year: 2024).*
Espacenet machine translation of Jp 2021120507A, generated Mar. 5, 2025. (Year: 2025).*
Espacenet machine translation of JP 2021120507A, generated Mar. 6, 2025. (Year: 2025).*

* cited by examiner

SECURING ARRANGEMENT ON A MOTOR VEHICLE DOOR

FIELD OF DISCLOSURE

The invention relates to a securing arrangement on a motor vehicle door, having an actuating element, in particular a securing button, and having a mechanical transmission element for acting upon, for example, a motor vehicle latch, wherein the actuating element penetrates a door opening and is mechanically coupled to the transmission element, and wherein an additional sealing element is provided in the region of the door opening.

BACKGROUND OF DISCLOSURE

Securing arrangements on a motor vehicle door are used in many different ways. Previously, such securing arrangements were typically used as a securing button in order to be able to lock the associated motor vehicle door from the inside. In this way, the securing button in question has frequently also been referred to as an inner locking button. Such a procedure is described by way of example in the utility model DE 77 16 177 U.

The inner locking button realized therein is in this case designed to be conically tapered toward the top. In addition, the inner locking button is inserted into an opening of a window board as a component of the motor vehicle door. In the opening, a plastic sleeve is provided which is penetrated by the inner locking button in question, which in turn is coupled to a linkage that establishes the necessary mechanical connection to a motor vehicle latch.

The term "motor vehicle door" is to be interpreted broadly within the scope of the present invention. In this case, it not only refers to motor vehicle side doors or also motor vehicle tailgates, but in general, it also includes motor vehicle panels such as motor vehicle loading panels, motor vehicle tank flaps, motor vehicle lifting and sliding roofs, etc. In any case, the motor vehicle doors or motor vehicle panels in question can typically be mechanically locked and unlocked without difficulty by means of such a securing arrangement. For this purpose, the actuating element and in particular the securing button acts generally upon the motor vehicle latch located in the interior of the motor vehicle door, with interposition of the mechanical transmission element.

In this context, acting upon the actuating element and in particular the securing button corresponds to the fact that the motor vehicle latch is optionally locked and unlocked by means of the securing button. This can be carried out independently of an additionally provided electric or electronic locking and unlocking process, which generally takes place with recourse to one or more electric motors. This has proven itself in principle.

Due to the sealing element additionally provided in this context in the region of the door opening, sealing of the compulsory door opening is already provided. However, the assembly in this context is complicated insofar as the seal, together with the actuating element, must be placed in the door opening and the actuating element must subsequently be coupled to the mechanical transmission element. For this purpose, the known generic teaching according to DE 10 2018 128 027 A1 refers back, among other things, to a configuration in which an actuating rod engages as a mechanical transmission element with a toothing in an additional counter-toothing on the actuating element or in the region of the motor vehicle latch. Establishing a rotatably fixed connection in this context is relatively complex.

Even greater problems are observed if, for example, a cable pull and in particular a Bowden cable having a core and a sheath are used as the mechanical transmission element. This is because, in this case, it is necessary for the core to be coupled, or to be already coupled, to the actuating element, and the sheath surrounding the core additionally requires a seal. Without such a seal, there is the risk that, for example, water but also dust and contaminants in general can enter the cable pull or the Bowden cable between the core and the sheath via the door opening on which the actuating element is mounted. This impairs the functionality and in the worst case leads to a failure of the mechanical transmission element or the cable pull or the Bowden cable. At this point, no convincing solutions have so far been available in connection with such a flexible mechanical transmission element in the exemplary form of a Bowden cable. The invention as a whole seeks to remedy this.

SUMMARY OF DISCLOSURE

The technical problem addressed by the invention is that of further developing such a securing arrangement on a motor vehicle door such that proper sealing in particular of the mechanical transmission element with respect to in particular water, but also dirt and dust, is achieved, so that the functionality thereof is ensured even over long time scales.

For solving this technical problem, the invention proposes in a generic securing arrangement that the sealing element is provided on and/or in a grommet engaging over the mechanical transmission element.

Thus, within the scope of the invention, first of all and obligatorily, a grommet is used which is provided at the end of the mechanical transmission element. In this context, the grommet as a rigid and in particular tubular end piece ensures that the mechanical transmission element is already subjected to a certain sealing effect in the transition to the actuating element. For this purpose, the grommet can be made of plastic and/or metal and is typically fixed to a sheath of the transmission element designed as a cable pull. In most cases, a Bowden cable having a core and a sheath is used at this point, wherein the grommet is fixed to the sheath and penetrated by the core. In general, however, the mechanical transmission element can also be designed as an actuating rod.

Either way, the mechanical transmission element ensures that the actions upon the actuating element and in particular upon the securing button are transmitted via the mechanical transmission element to the motor vehicle latch. For this purpose, the mechanical transmission element may be connected to a locking lever which is mostly guided out of an associated latch housing and is pivoted by means of the mechanical transmission element and by an action upon the actuating element, for example, from its previously assumed "unlocked" position to the "locked" position of the motor vehicle latch, or vice versa. This can take place additionally or alternatively to an electric locking drive in the interior of the motor vehicle latch, specifically manually by an operator by an action upon the actuating element or the securing button.

According to the invention, two different variants of the sealing element are now available. In a first variant, the sealing element can be provided on the grommet engaging over the mechanical transmission element. In this case, the procedure is usually such that the sealing element engages over the grommet on the head side and seals against the transmission element. Since the grommet head typically has a recess for a foot-side pin located on the actuating element to dip into, the design in this context is further preferably selected such that the sealing element engages over the recess in question on the head side. For this purpose, the sealing element can be designed as a sealing cap made of an elastomeric material.

By way of an alternative or additional approach, it is also possible to proceed such that the sealing element is provided in the grommet engaging over the mechanical transmission element. In this case, the sealing element is consequently located in the grommet or in its interior, which in turn engages over the mechanical transmission element. In this case, the sealing element bears against the inside of a grommet head and seals the grommet off from the transmission element. In this case, the procedure generally further provides that the sealing element in question engages the recess usually provided on the grommet head from below and seals the grommet off from the transmission element. In this case, the sealing element is advantageously designed as a ring seal and in particular as an O-ring seal made of an elastomeric material.

Either way, the sealing element designed as a sealing cap made of the elastomeric material or the ring seal made of the elastomeric material and provided at this location ensures that the grommet engaging over the mechanical transmission element is properly sealed. In fact, the sealing element overall ensures that the grommet is sealed in any case with respect to any water penetrating through the door opening, which consequently cannot penetrate into the grommet and thus also not into the transmission element, which is advantageously the previously mentioned cable pull and in particular the Bowden cable having a core and a sheath. This means that any water penetrating between the core and the sheath, as well as possibly dirt or dust, is prevented and avoided at this location.

For this purpose, the core is generally connected to the actuating element, whereas the sealing element forms a connection with the sheath and/or the grommet. In this manner, the sealing element ensures in both variants that in particular via the recess provided on the grommet head for the foot-side pin located on the actuating element to dip into, and gaps observed in this region are closed by the sealing element. As a result, neither water nor dust or dirt can get into the space between the core and the sheath via these previously open gaps, provided that the actuating element is the cable pull and in particular the Bowden cable having a core and a sleeve, advantageously provided at this location. As a result, the functionality in particular of the transmission element is also ensured over long time scales and possible failures can be prevented according to the invention.

At the same time, the actuating element and in particular the securing button continue to be properly guided when acted upon. As stated above, this is usually carried out manually by an operator. In this process, the foot-side pin on the actuating element in question dips into the recess on the grommet head. This can be attributed to the fact that the sheath is designed to be stationary in the case of the typically used Bowden cable or has a fastening, whereas the core movable within the sheath is used for force transmission, namely from the actuating element or the securing button to the locking lever mounted on the outside of the latch housing in the described example case. As a result, it is ensured that the core connected to the actuating element as a component of the transmission element is guided and acted upon properly in the interior of the sheath enclosing the core when the actuating element and in particular the securing button are acted upon. This makes it possible to prevent any malfunctions from the outset.

At the same time, the grommet in conjunction with the sealing element provided according to the invention ensures that, at this location, an opening or a gap is present and observed between the guide sleeve, inserted in the door opening, for the actuating element and the grommet. However, at most water or moisture may reach the interior of the motor vehicle door via said gap, but cannot enter the space between the core and the sheath enclosing the core as the two components of the Bowden cable which is preferably realized at this location as a transmission element.

In addition to proper sealing in this region, installation and assembly are also facilitated. For this purpose, the design is usually selected such that the core is anchored and fixed in the interior of the actuating element or the securing button. The sheath enclosing the core is now sealed by means of the additionally provided sealing element, in particular the space between the core and the sheath. For this purpose, the sealing element in one variant is provided on the grommet engaging over the mechanical transmission element and, in this context, acts as a sealing cap to seal the front end of the sheath with the core exiting therefrom and entering the actuating element. In the further second variant, the sealing element is provided in the interior of the grommet, engages the grommet on the head side from below and at the same time ensures the required sealing relative to the transmission element or in particular the core of the Bowden cable generally provided at this location. Herein lie the essential advantages.

BRIEF DESCRIPTION OF DRAWINGS

The invention is explained in greater detail below with reference to drawings which show only one exemplary embodiment. In the drawings.

DETAILED DESCRIPTION

Figure 1:
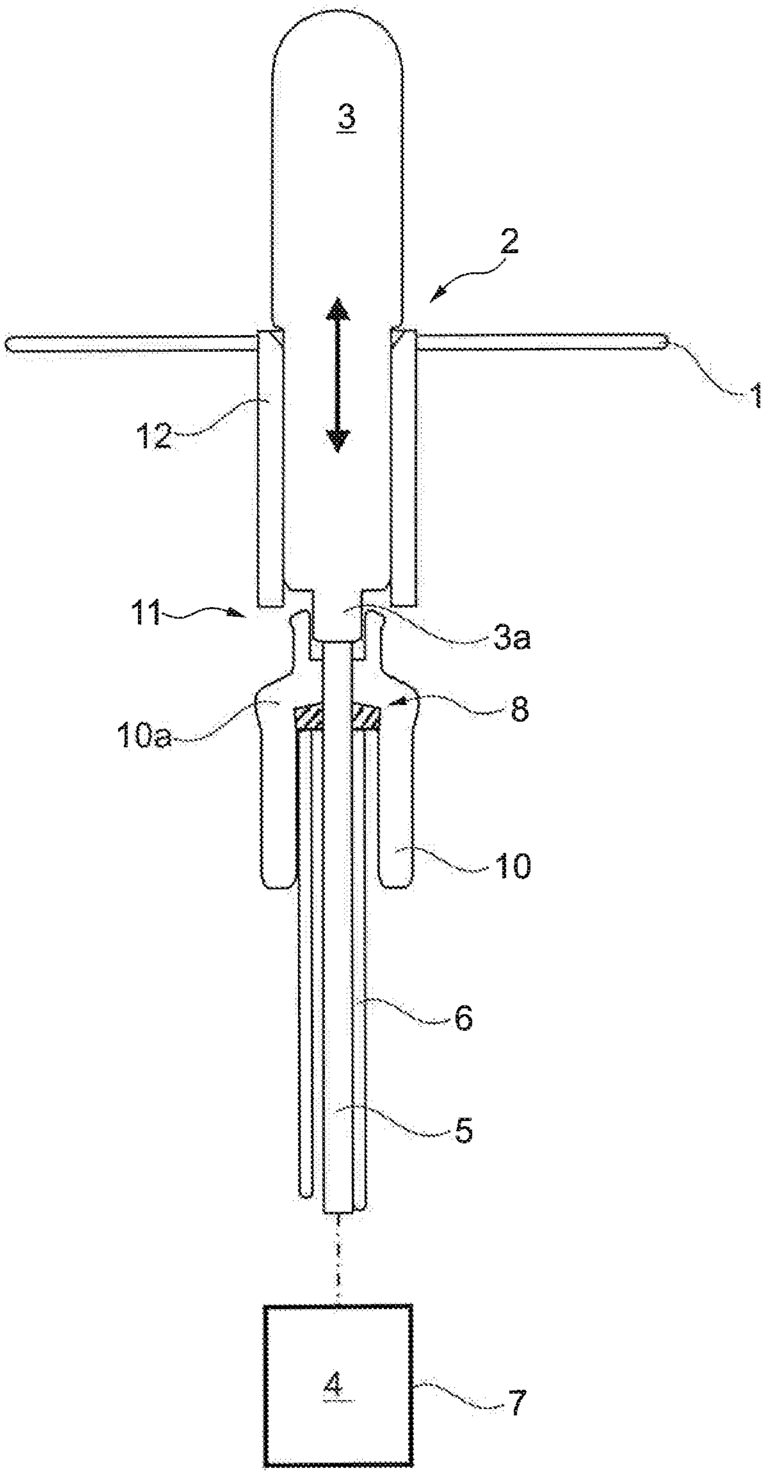
FIG. 1 shows a first variant of the securing arrangement according to the invention on a motor vehicle door.
Figure 2:
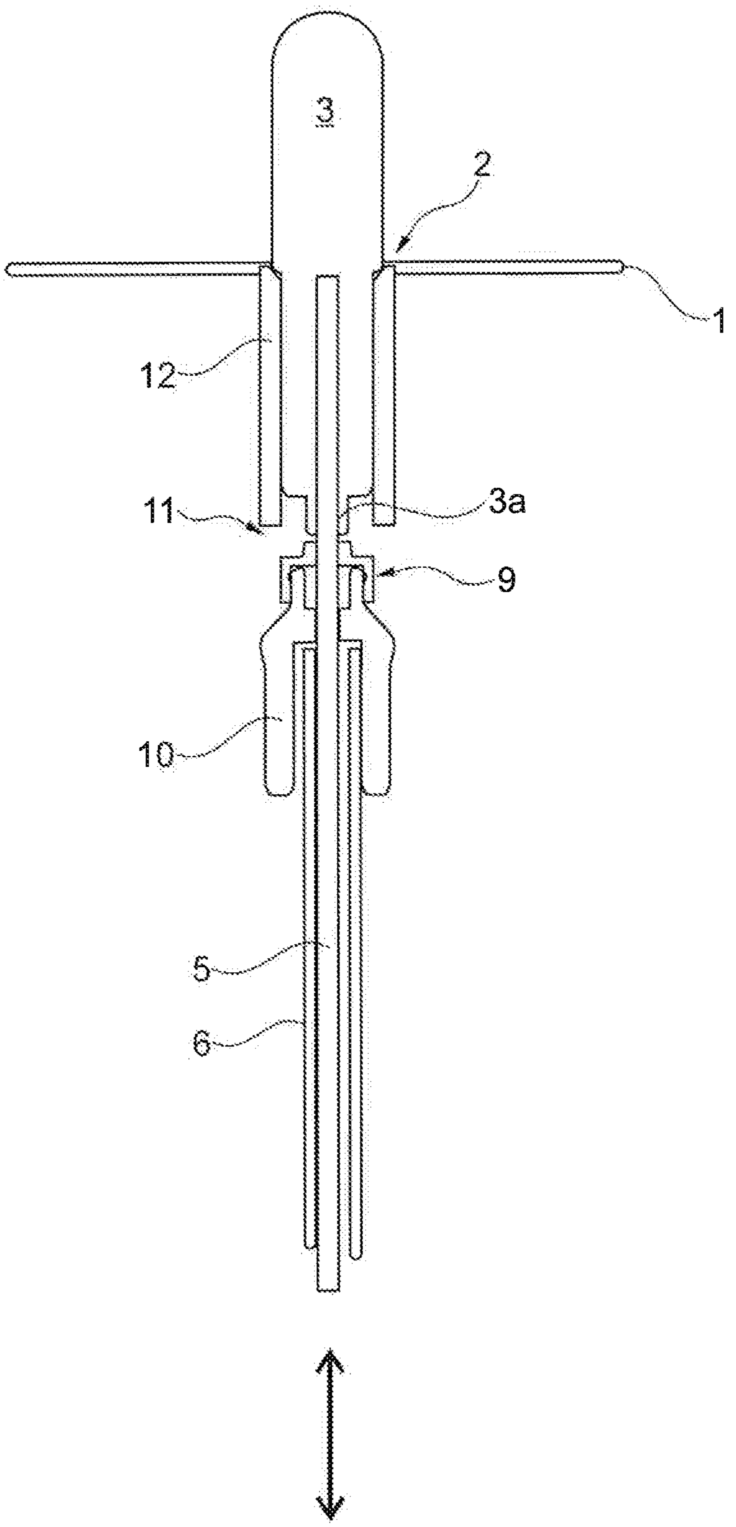
FIG. 2 shows another, modified embodiment.

The figures show a securing arrangement on a motor vehicle door 1. The motor vehicle door 1 is a motor vehicle side door which is shown in FIGS. 1 and 2 only in section and partially. In principle, the motor vehicle door 1 in question can be any panel in or on a motor vehicle (not shown). For this purpose, the motor vehicle door 1 is equipped with a door opening 2, into which an actuating element 3 is inserted. In the exemplary embodiment, the actuating element 3 is a securing button which ensures, for example, that inner locking of a motor vehicle latch 4, which is shown only in FIG. 1, can be mechanically and manually implemented. For this purpose, it is necessary for the actuating element 3 or the securing button realized at this location to be acted upon in its longitudinal direction, as indicated by a double arrow in FIG. 1.

The actuating element 3 is in turn mechanically connected to a mechanical transmission element 5, 6. The mechanical transmission element 5, 6 is, in the context of the exemplary embodiment and not in a limiting manner, a cable pull 5, 6 and in particular a Bowden cable 5, 6 having a core 5 and a sheath 6 surrounding the core 5.

In order to enable the motor vehicle latch 4 to be acted upon by means of the core 5 and, in particular, for a locking lever guided out of a latch housing 7, for example, to be pivoted, it is necessary that a push/pull movement is transmitted by means of the actuating element 3 to the core 5 in its longitudinal direction, said push/pull movement being indicated in FIG. 2 by a double arrow. For this purpose, the core 5 is connected to the actuating element 3 and, in contrast, the sheath 6 is designed to be stationary, for example connected to the housing or latch housing 7 of the motor vehicle latch 4 in question so that, as a result of the axial movement of the core 5, the necessary pivoting movement can be introduced into the locking lever of the motor vehicle latch 4, which locking lever is not expressly shown and projects out of the latch housing 7.

For this purpose, the actuating element 3 or the securing button realized at this location penetrates the already described door opening 2 and is mechanically coupled to the mechanical transmission element 5, 6. In addition, a sealing element 8, 9 is realized. Within the scope of the embodiment variant according to FIG. 1, the sealing element 8, 9 is provided in a grommet 10 engaging over the mechanical transmission element 5, 6. In this variant, the procedure is further such that said sealing element 8 abuts the inside of the grommet head 10*a*. In addition, the sealing element 8 ensures that the grommet 10 is sealed with respect to the transmission element 5, 6 and quite specifically with respect to the core 5. For this purpose, the sealing element 8 is in this case designed as a ring seal and in particular as an O-ring seal made of an elastomeric material.

In the alternative variant according to FIG. 2, the sealing element 9 there is not arranged in the grommet 10 engaging over the mechanical transmission element 5, 6 as in the variant according to FIG. 1, but instead, it is arranged on the grommet 10 in question and ensures that the sealing element 9 there engages on the head side over the grommet 10 in question. In this case, the sealing element 9 also ensures that the grommet 10 is sealed with respect to the transmission element 5, 6. For this purpose, the seal 9 is in this case designed as a sealing cap made of an elastomeric material. In principle, the two variants can also be combined with one another. In this case, both the sealing cap 9 and the ring seal 8 are simultaneously realized on or in the grommet 10.

In both variants, the grommet 10 is equipped at its grommet head 10*a* with a recess 11 into which the actuating element 3 or the securing button dips or is able to dip with a foot-side pin 3*a*. In this way, the actuating element 3 or the securing button realized at this location is properly guided relative to the transmission element 5, 6 and in particular to the grommet 10 sealing off the transmission element 5, 6 on the head side. In addition, a guide sleeve 12 which is inserted into and anchored in the door opening 2 ensures the additional guidance of the actuating element 3 and in particular of the securing button realized at this location. Within the guide sleeve 12, the actuating element 3 or the cylindrical securing button realized at this location is guided. For this purpose, supplementary guide means and counter-guide means can be realized and provided on the actuating element 3 and on the guide sleeve 12, respectively, which, however, is not shown in detail.

It can be seen that the core 5 is in each case connected to the actuating element 3. For this purpose, the core 5 may be anchored in the interior of the cylindrical actuating element 3 generally made of plastic or metal. In contrast, the sealing element 8, 9 is in each case connected to the sheath 6 or the grommet 10. For assembly, it is only necessary to place the additional sealing element 8 in the form of the ring seal into the interior of the grommet 10 or, alternatively, to place the sealing cap 9 over the grommet 10 or the recess 11 provided at this location on the grommet head 10*a*.

LIST OF REFERENCE SIGNS

Motor vehicle door 1
Door opening 2
Actuating element 3
Pin 3*a*
Motor vehicle latch 4
Transmission element 5, 6
Cable pull 5, 6
Core 5
Sheath 6
Latch housing 7
Sealing element 8, 9
Sealing cap 9
Grommet 10
Grommet head 10*a*
Recess 11
Guide sleeve 12

The invention claimed is:

1. A securing arrangement on a motor vehicle door comprising:
- an actuating element,
- a mechanical transmission element for acting upon a motor vehicle latch, wherein the actuating element penetrates a door opening and is mechanically coupled to the mechanical transmission element,
- a sealing element that is provided in a region of the door opening, and
- a grommet that engages with the mechanical transmission element wherein the sealing element is provided on and/or in the grommet,
- wherein the grommet has a recess on a grommet head for receiving a foot-side pin located on the actuating element, wherein the foot-side pin is configured for entering into and exiting out of the recess as the actuating element moves,
- wherein the sealing element is fixedly attached to the grommet at the grommet head to seal the grommet off from the mechanical transmission element, and
- wherein the sealing element abuts an inside of a grommet head of the grommet and seals the grommet off from the mechanical transmission element.

2. The securing arrangement according to claim 1, wherein the sealing element engages the grommet head from below to seal the grommet off from the mechanical transmission element.

3. The securing arrangement according to claim 1, wherein the sealing element includes a ring seal made of an elastomeric material.

4. The securing arrangement according to claim 1, wherein the mechanical transmission element includes a Bowden cable having a core and a sheath.

5. The securing arrangement according to claim 4, wherein the core is connected to the actuating element and the sealing element is connected to the sheath and/or to the grommet.

6. The securing arrangement according to claim 1, further comprising a guide sleeve for guiding the actuating element and that is inserted into the door opening.

7. The securing arrangement according to claim 1, wherein the actuating element includes a securing button that is manually actuatable.

8. The securing arrangement according to claim 1, wherein the actuating element has a cylindrical configuration.

* * * * *